No. 651,902. Patented June 19, 1900.
S. P. TOWNSEND.
LAWN MOWER.
(Application filed Jan. 10, 1899.)

(No Model.) 2 Sheets—Sheet 1.

Witnesses:
Louis M. Whitehead.
Charles DeCou.

Inventor:
Samuel Percy Townsend,
by his Attorneys,
Howson & Howson

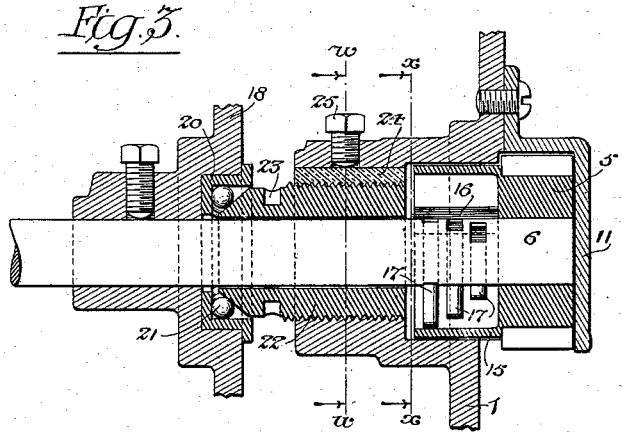

UNITED STATES PATENT OFFICE.

SAMUEL PERCY TOWNSEND, OF BLOOMFIELD, NEW JERSEY.

LAWN-MOWER.

SPECIFICATION forming part of Letters Patent No. 651,902, dated June 19, 1900.

Application filed January 10, 1899. Serial No. 701,745. (No model.)

*To all whom it may concern:*

Be it known that I, SAMUEL PERCY TOWNSEND, a citizen of the United States, and a resident of Bloomfield, New Jersey, have invented certain Improvements in Lawn-Mowers, of which the following is a specification.

My invention consists of certain improvements in lawn-mowers, the character and objects of my improvements being fully set forth hereinafter and the new constructions and combinations of parts constituting my invention being specifically claimed.

Figure 1:
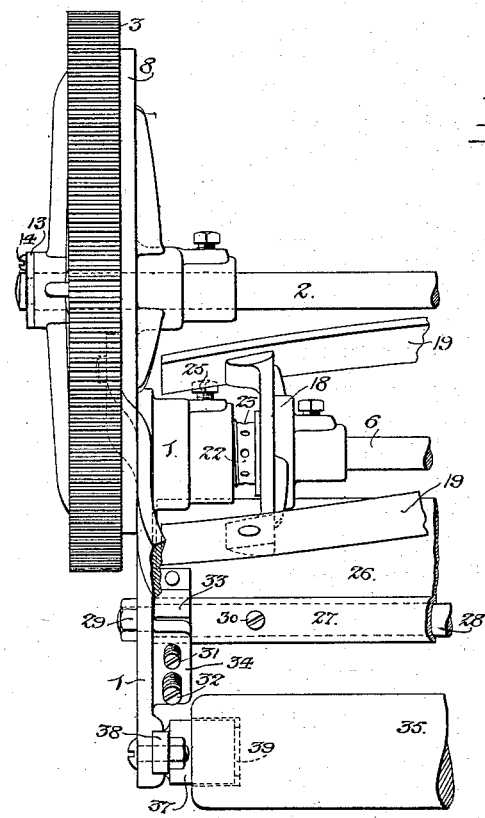
Figure 1:
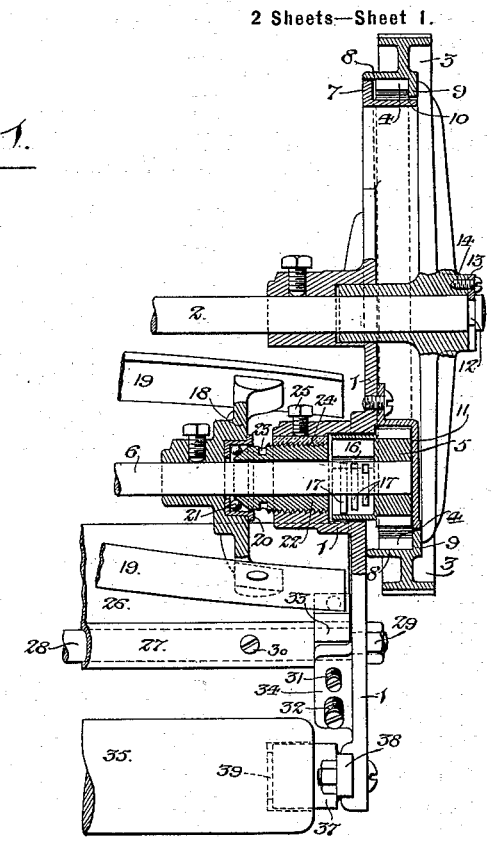
Figure 2:
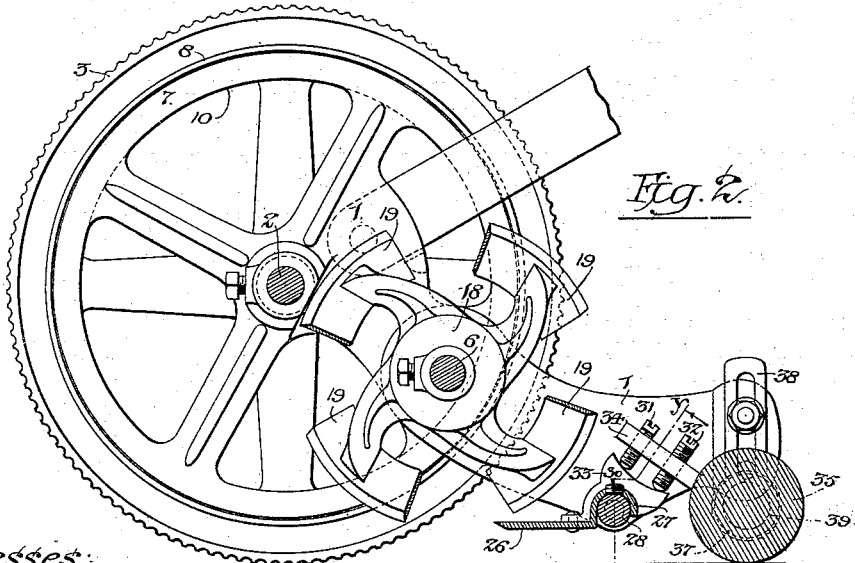

In the accompanying drawings, Figure 1 is a plan view, partly in section, of sufficient of a lawn-mower to illustrate my present improvements. Fig. 2 is a longitudinal section of the same, partly in elevation. Fig. 3 is an enlarged section of one of the reel-bearings and part of the driving mechanism of the reel. Fig. 4 is a section on the line $w\,w$, Fig. 3. Fig. 5 is a section on the line $xx$, Fig. 3. Fig. 6 is an end view of the hub portion of one of the traction-wheels of the machine, showing the shaft in section. Fig. 7 is a longitudinal section, on an enlarged scale, on the line $y\,y$, Fig. 2. Fig. 8 is a view, partly in longitudinal section and partly in elevation, also on an enlarged scale, of one of the end bearings for the rear roller of the machine; and Fig. 9 is a view illustrating a modification of part of the invention.

The opposite side frames of the machine are represented at 1 1, these side frames being connected together at the forward ends by a transverse rod or shaft 2, upon the projecting ends of which are mounted so as to turn freely the traction driving-wheels 3 of the machine, each of said wheels, or either of them, as desired, having an internal annular rack 4, which meshes with a pinion 5 on the reel-shaft 6. Each side frame 1 has a projecting flange 7, which, except at and near the pinion 5, is overlapped by a laterally-projecting flange 8 on the wheel 3, and said wheel has an inwardly-projecting flange 9, which, except at and near the pinion 5, is overlapped by a laterally-projecting flange 10 on the side frame, so that throughout the greater portion of its extent the annular rack 4 is inclosed and protected by the flanges 7, 8, 9, and 10, the openings between which are all transverse, no vertical opening being presented through which grass or dirt can enter to interfere with the free running or effective operation of the driving-rack and pinion. The pinion 5 is covered by a cap-plate 11, located upon the outside of the side frame 1 and also forming a transverse joint with the flange 9 of the wheel 3, as shown in Fig. 1.

In order to secure each wheel 3 longitudinally to the shaft 2 and yet permit free rotation of said wheel, the shaft has near its outer end a groove 12, to which is adapted a forked washer 13, secured by a set-screw 14 or other available means to the hub of the wheel 3, this washer serving to prevent lateral movement in either direction of the wheel upon the shaft, but permitting the free turning movement of said wheel and being readily removed when it becomes necessary to withdraw the wheel from the shaft.

The pinion 5 is mounted so as to be capable of turning freely upon the shaft 6 of the cutter-reel, and said pinion has a hollow hub 15, with a series of internally-projecting teeth 16, with which are adapted to engage pawls 17, mounted in openings in the reel-shaft, so as to be free to slide radially in said openings, the teeth 16 being so formed that the pinion 5 can turn backwardly independently of the reel-shaft, the beveled backs of the teeth in such case simply causing the pawls 17 to slide through the openings in the reel-shaft; but on the forward movement of the pinion the abrupt face of one of its teeth 16 will engage with one of the pawls 17 and will drive the reel-shaft forwardly.

By the use of a series of pawls located side by side along the shaft and disposed at different angles within the compass of a single tooth of the driving-wheel I correspondingly lessen the amount of lost motion whenever the pinion 5 changes from a backward to a forward motion, the lost motion in any case being only that which exists between the face of a tooth 16 and that of the nearest pawl 17 when the motion of the pinion is reversed. Hence if three teeth and three pawls are employed the lost motion will in no case exceed one-ninth of a turn and by increasing the number of teeth and pawls the lost motion may be still further reduced.

The end spiders 18 of the reel are rigidly bolted to the reel-shaft 6 and carry the cutting-blades 19 of the reel, as usual, and each of said end spiders is recessed for the reception of a steel box or pocket 20, constituting a race for a series of balls 21, the other race for which is formed by a cone 22, having a threaded stem adapted to a threaded opening in the side frame 1 and provided with openings 23 for the reception of a suitable implement, whereby it may be readily turned in order to tighten or slacken the ball-bearing for the end of the reel.

As a means of securing the cone in position after adjustment I use a block 24, of brass, copper, or other soft metal or alloy, let into a recess in the threaded portion of the side frame 1 and bearing upon the threaded stem of the cone 22, this locking-block 24 being pressed inwardly by means of a set-screw 25, so that it may be caused to bear so firmly against the thread of the cone as to effectually prevent any accidental movement of the same which would either tighten or loosen the bearing after the same had once been properly adjusted.

The fixed knife 26 of the mower consists of a flat plate of steel having at the rear end a segmental rib 27, which is mounted upon a bearing-bar 28, extending from one side frame of the machine to the other and reduced in diameter at each end, so as to form a shoulder against which the side frame bears, as shown in Fig. 7, the reduced portion of the rod being threaded for the reception of a nut 29, whereby the rod is firmly secured to each side frame. The bearing-rod thus serves as a rigid portion of the frame of the machine and is never disturbed by the adjustment of the knife 26, the latter being simply moved upon the bearing-bar in order to bring its cutting edge into proper relation to the knives of the reel. Direct vertical adjustment of the knife may be effected by means of set-screws 30, adapted to threaded openings in the hollow rib 27 and bearing upon the top of the rod 28, and swinging movement of the knife on the bearing-bar can be effected by the action of set-screws 31 and 32 upon a block 33, the set-screws being adapted to threaded openings in a lug 34 on the side frame and the block 33 being secured to the knife-bar 26 at or near each end of the same. I thus provide for a much more accurate adjustment of the fixed knife than is possible with any adjusting devices with which I am familiar, for not only can the knife be moved bodily so as to move its cutting edge from or toward the knives of the reel, but either end of the knife may be raised or lowered independently of the other, and any lack of truth in the alinement of the reel-blade, as might be caused by differences in the side frames of the mower, may thus be compensated for. Furthermore, adjustments of the fixed knife are effected without interfering in any way with the absolute rigidity of the framework of the machine which arises from the permanent connection of the rod 28 with each of the side frames 1.

In the modification shown in Fig. 9 a cast-metal bar 40, resting on the rod 28 and extending across the machine, takes the place of the hollow segmental rib 27 and end blocks 33 of the construction previously described, the cutter-bar 26$^a$ in this case being secured to the under side of the bar 40 and the adjustments of the latter being effected by set-screws 30 31 32 in the same manner as before.

In order to provide a better bearing than usual for the ends of the rear wooden roller 35 of the machine, I form in each end of the roller an annular groove 36, to which is adapted a hollow stud 37, projecting from a bar 38, vertically adjustable on the side frame of the machine, as usual, said hollow stud receiving the central tongue or plug 39 of the roller and constituting a bearing therefor to which the access of grass or dirt is much more difficult than to a simple opening formed in the end of the roller for the reception of a solid stud on the bar 38, as usual.

Having thus described my invention, I claim and desire to secure by Letters Patent—

1. The within-described fixed knife for a lawn-mower, said knife consisting of a straight projecting blade of sheet metal having a hollow segmental rib at the rear with concave under surface, whereby it can be mounted upon a bearing-rod, so that the forward or cutting edge of the straight projecting portion of the blade can be raised or lowered, substantially as specified.

2. The combination of the side frames of the mower, a transverse rod rigidly secured thereto, and having shoulders against which the side frames are firmly pressed so that the rod acts as a brace for the frame, a fixed blade and a bar whereby it is mounted upon said rod, substantially as specified.

3. The combination of the side frames of the mower, the transverse rod secured thereto, the fixed cutter-blade, a bar whereby said blade is mounted on the rod, and set-screws carried by said bar and bearing upon the top of the rod so as to provide for vertical adjustment of the cutter-blade, substantially as specified.

In testimony whereof I have signed my name to this specification in the presence of two subscribing witnesses.

SAMUEL PERCY TOWNSEND.

Witnesses:
W. H. DRAKE,
ARTHUR RUSSELL.